Jan. 12, 1960 W. S. PERCIVAL 2,921,194

DISTRIBUTED AMPLIFIERS AND WAVE FILTERS

Filed Sept. 26, 1956 3 Sheets-Sheet 1

Inventor
W. S. Percival
By Glascock Downing & Seebold
Attys.

Jan. 12, 1960 W. S. PERCIVAL 2,921,194

DISTRIBUTED AMPLIFIERS AND WAVE FILTERS

Filed Sept. 26, 1956 3 Sheets-Sheet 2

Inventor
W. S. Percival
By Glascock Downing & Seebold
Attys.

DISTRIBUTED AMPLIFIERS AND WAVE FILTERS

Filed Sept. 26, 1956 3 Sheets-Sheet 3

Inventor
W. S. Percival
By Mascock Downing & Seebold
Attys.

United States Patent Office 2,921,194

Patented Jan. 12, 1960

2,921,194

DISTRIBUTED AMPLIFIERS AND WAVE FILTERS

William Spencer Percival, West Ealing, London, England, assignor to Electric & Musical Industries Limited, Hayes, Middlesex, England, a company of Great Britain Application September 26, 1956, Serial No. 612,323

Claims priority, application Great Britain September 27, 1955

9 Claims. (Cl. 250—27)

Figure 1:
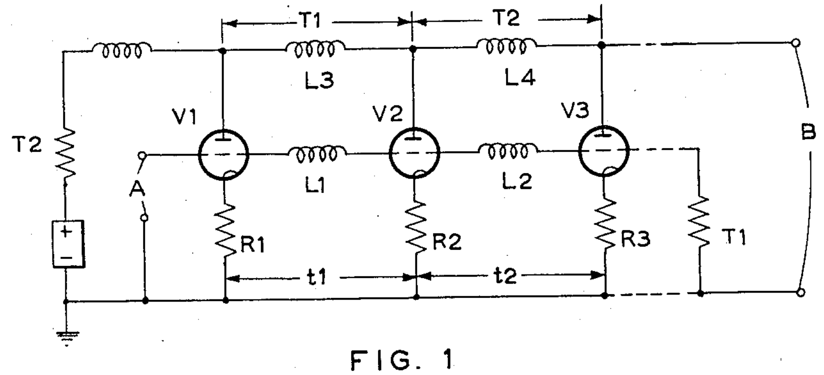

This invention relates to distributed amplifiers and wave filters.

The use of a distributed amplifier for obtaining high gain and power output over a wide band of frequencies is well known and in such an amplifier impulses to be amplified are applied to a grid line such that the impulses energise each of the valves connected in the grid in turn and by so doing produce pulses in the anode line, the grids and anodes being connected to their respective lines in the same order. Each pulse reaching the output is associated with a time delay equal to a time of transit along a portion of the grid line and a portion of the anode line. These pulses set up in the anodes will be termed partial input signals since each forms only part of the total output brought about by a single pulse input.

Moreover, in a distributed amplifier it is generally arranged that the delays are substantially the same for each partial input signal, hence the pulses arrive simultaneously at the output of the anode line and produce a single output pulse of an amplitude equal to the sum of the individual partial input signals. Some forms of distributed amplifier are described in the specification of United States Patent Number 2,211,859.

The transversal filter amplifier is similar to the distributed amplifier in that it possesses a grid line and an anode line, the grids and anodes being connected to their respective lines in the same order, but the two types of amplifier differ in that for the transversal filter amplifier the input is applied at the opposite ends of the respective grid lines. Also in the transversal filter amplifier provision is made for reversing the sign of amplification and for controlling the contribution made by each valve to the total output, which is not so in the distributed amplifier. Hence in a transversal filter amplifier no two partial output signals have the same delay and the amplitude of the output waveform cannot be greater than that produced by any one valve. On the other hand, since each partial output signal pulse arrives at the output at a different time and the magnitude and sign of each pulse is controllable, the greatest possible variety of waveforms can be produced, these being limited only by the maximum duration of the delay, the number of connections of the valves to the delay networks and the cut-off frequency of the lines. Some forms of transversal filter amplifiers are described in United States Patent No. 2,263,376.

The object of the present invention is to combine the usual advantages of a distributed amplifier with the ability to set up a required response and to vary this response when required.

According to one aspect of the present invention there is provided a filter amplifier comprising a plurality of valves, an input line and an output line, the control electrodes and output electrodes of said valves being connected to said lines in such a way that an output signal can be derived having a maximum amplitude greater than that of each partial output signal and having a desired waveform different from that of the input signal.

The invention has application to amplifiers in which the main purpose is to obtain a special type of response in conjunction with substantial gain. However, in practice it is likely that, for many applications of the invention most of the partial output signal pulses would superimposed at the output, the remaining partial pulses serving to provide a limited degree of waveform correction so as to reduce distortion, such as overshoot which would otherwise be caused by the amplifier.

According therefore to another aspect of the present invention there is provided a filter amplifier comprising a plurality of valves, an input line and an output line, and means for applying an input signal of predetermined duration to said input line, the control electrodes and output electrodes of said valves being connected to said lines in such a way that, having regard to the duration of said input signal, at least two partial output signals are wholly, or in part, superimposed with like polarity and at least one partial output signal is not substantialy superimposed on said first mentioned partial output signals, or in other words is substantially dispersed relative to the superimposed output signals.

Preferably, in accordance with this aspect of the invention, means are provided for varying the gain of each valve which contributes a dispersed partial output signal with respect to the gain of the valves which contribute the superimposed partial output signals. By virtue of such means the gain of each valve which contributes a dispersed partial output pulse can be reduced, or each such valve can be switched off, whilst leaving the other valves undisturbed, thereby enabling a large variety of different responses to be obtained, bearing in mind that when each valve which would otherwise contribute a dispersed partial output signal is switched off the amplifier response will be that of a distributed amplifier. For example, the amplifier may be so arranged that the response can be changed from a flat amplitude/frequency response to a response having no overswing on an impulse or a Heaviside unit function. This is achieved by causing all the partial pulses to be superimposed, save one or two which serve to eliminate such overswings as would occur with a distributed amplifier designed to give a flat amplitude/frequency response with superimposed partial pulses.

In another form of amplifier according to the present invention at least one partial pulse output signal which is dispersed is reversed in sign as compared with the two or more partial pulses which are superimposed with like polarity and can be identified with the main pulse.

This form of the present invention may be employed to give a negative going overswing preceding an amplified pulse. For example, a flat amplitude/frequency response with constant time delay should give such an overswing but in fact is not produced by a normal distributed amplifier and could be produced if a single reversed pulse of appropriate delay were made available by means of the invention.

As will appear in the following description, reversal of partial output signals may be accomplished by various means such as a push-pull input, in which the grids are connected to a voltage of either sign, a reversing transformer from the grid line to a grid or from an anode to the anode line, an additional reversing valve or an electron multiplier which gives a voltage on its dynode reversed with respect to pulses produced by ordinary valves. In the case of a push-pull distributed amplifier, it is merely necessary to connect the appropriate anodes or grids to the line of opposite potential.

In order that the present invention may be clearly understood and readily carried into effect, the same will be described with reference to the accompanying drawings, in which:

Figures 1 to 7 illustrate examples of filter amplifiers according to the present invention.

In each of the filter amplifiers illustrated only three valves are shown, for simplicity, but in practice the number would generally be greater dependent on the response required.

The filter amplifier of Figure 1 comprises three valves V1, V2, V3 arranged to operate as partial amplifiers with their grids and anodes connected successively in the same order by inductors L1, L2, and L3, L4 respectively as shown so as to form (in conjunction with distributed capacity) a grid line and an anode line. Bias and a measure of feedback is applied to these valves by grounded cathode resistors R1, R2, R3, respectively the values of which are chosen to set the gain of the respective valves at required values. The terminals A form the input terminals to the grid line before V1, which line is terminated after the last valve by resistor T1, whilst the terminals B after the last valve form the output terminals from the anode line which is terminated by resistor T2 before V1.

Operation of the filter amplifier of Figure 1 is similar to that of a distributed amplifier as described in the introduction insofar as partial output signals appear in the anode line as a result of a pulse input to the grid line. However, the response of the amplifier, that is the output waveform at the terminals B, is arranged to differ from that which would be produced by a distributed amplifier by arranging that the delay of the grid line between at least two valves differs from the delay of the anode line between the same two valves, whilst the delay of the grid line between at least two valves is the same as the delay of the anode line between the same two valves. In Figure 1, the delays of the grid and anode lines between respective grids and anodes of V1, V2, V3 are indicated by $t1$, $t2$, and T1, T2, respectively, and the desired result can be achieved by arranging that one (and in the particular example of Figure 1, only one) of the following conditions exists: $t1=T1$, or $t2=T2$, or $t1+t2=T1+T2$. Any of these conditions may be achieved by appropriate selection of the inductors L1, L2, L3, L4 and the corresponding inductors between subsequent valves. In this way there is achieved by the invention a measure of gain such as obtainable from a distributed amplifier with a measure of waveform control such as obtainable from a transversal filter amplifier, since a plurality of partial pulses produced by the respective valves will be substantially superimposed at the output whilst at least one partial pulse will be dispersed, that is not substantially superimposed. The amplifier may therefore be used to derive, from a single pulse input, waveforms such as those indicated in United States Patent Specification Number 2,263,376, and the production of such waveforms may be facilitated by arranging that the valves, or some of the valves, operate with different gains. This can be achieved by a suitable selection of cathode resistors, or in other ways. Obviously when there are many valves per stage, many different combinations of partial delays or valve gains can be selected, depending on the response required.

Figure 2:
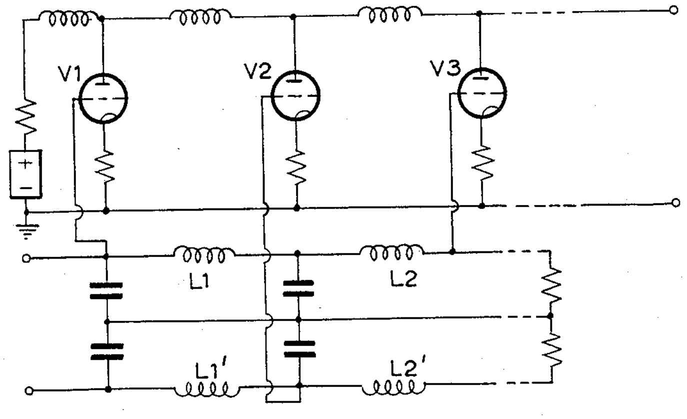

Figure 2 illustrates a filter amplifier similar to that illustrated in Figure 1 but a push-pull input arrangement is provided. Thus the valves V1, V2 and V3 are each coupled in the same manner as for Figure 1 to the input line comprising L3 and L4 but in addition to the input transmission line comprising L1 and L2 there is provided a further input line comprising inductances L1′ and L2′. The capacitative shunts for the input transmission lines are indicated as C1, C2 and C1′ and C2′ but these may be partially or totally absorbed in the interelectrode capacities of the valves. The input electrode of V1 is connected to the junction of C1 and L1, the input electrode of V2 is connected to the junction of C2′ and L2′ and the input electrode of V3 is connected to the terminal of L2 which is remote from C2. The dotted lines in the figure indicate that further valves may be included in the filter amplifier and what is shown is a minimum number for the purposes of describing the particular species of the invention. The input terminals A of Figure 2 on receiving an input pulse enable paraphase components of the signal to be set up in the transmission lines comprising L1, L2 and L1′, L2′. Thus in addition to one only of the conditions $t1=T1$, $t2=T2$, or $t1+t2=T1+T2$ being set up, as in Figure 1, the phase of the partial output of V2 is reversed with respect to that of the partial outputs of V1 and V3. As aforementioned, reversal of at least one partial pulse output as compared with the other partial output pulses can produce the advantage in certain applications, of a negative overswing before an amplified pulse.

Figure 3:
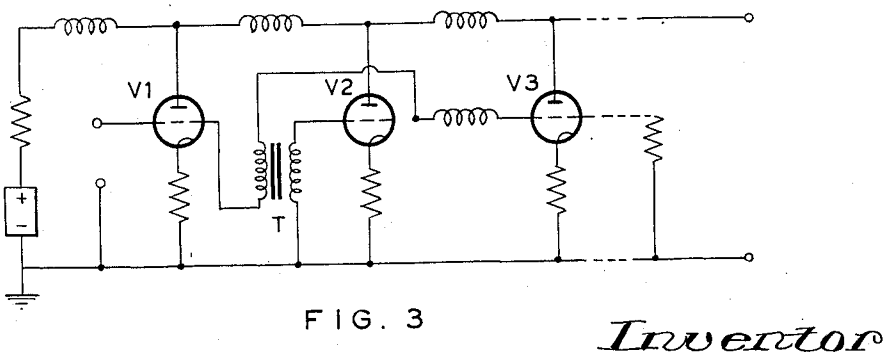

Another method of providing relative phase reversal of the partial output of one of the valves of the filter amplifier is such as is illustrated diagrammatically in Figure 3. In this Figure valves V1, V2 and V3 have their output electrodes connected as before but the arrangement of Figure 1 is modified in that the control electrode of V1 is coupled via the primary winding of the transformer T and the inductance L2 to the control electrode of V3. Thus the control electrode of V2 is effectively by-passed but for the coupling of the secondary winding of T to which the latter electrode is connected. The effect of T is to produce the requisite phase reversal at the valve V2. It will be understood that the primary winding of T and the inductance L2 are so chosen that the requisite delays are produced in the input transmission line.

Figure 4:
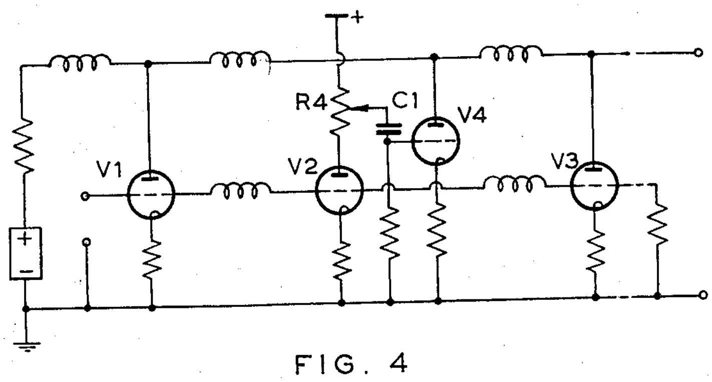

Yet another way of achieving phase reversal of the partial output of V2 is as aforesaid to employ an additional phase reversing valve. A filter amplifier employing such a phase reversing valve is illustrated in diagrammatical form in Figure 4. In Figure 4 the valves V1, V2 and V3 are connected to the input transmission line comprising inductors L1 and L2 in the same manner as for the arrangement of Figure 1 but the anode of V2 is coupled via a tapped resistor R4 to a positive potential source. The additional phase reversing valve V4 has its anode connected to the output line and its control electrode is resistance capacity coupled in conventional manner to the tapping on the resistor R4. The valve V4 thus has the effect of producing a controllable degree of gain and phase reversal in the partial output signals derived from V2 before they are transmitted to the output terminals of the filter amplifier.

Figure 5:
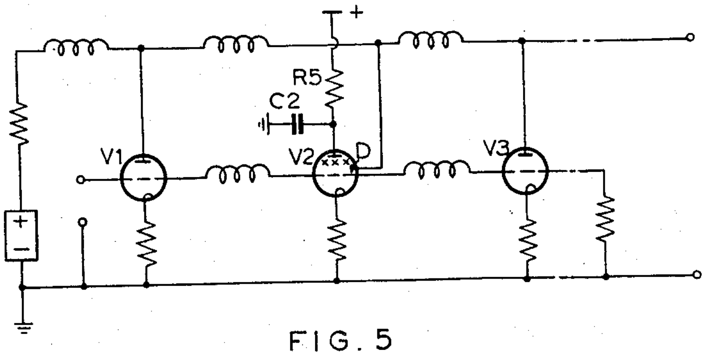
Figure 6:
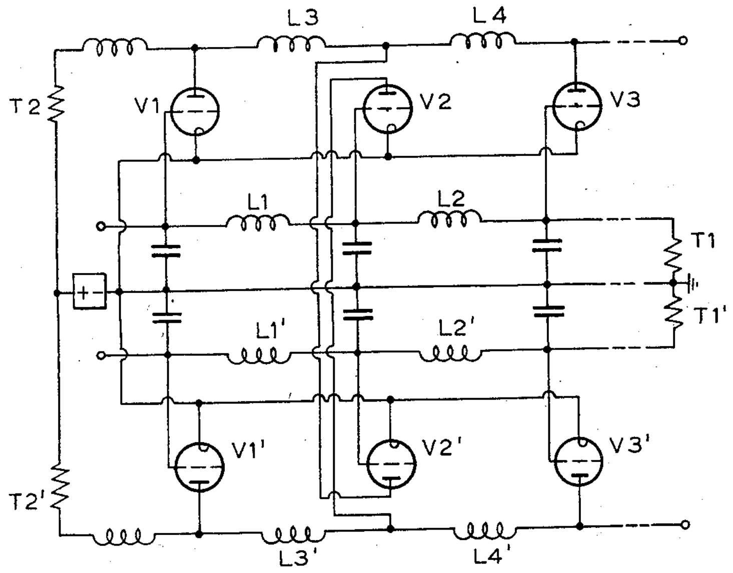

Yet another way of providing relative phase reversal of the partial output signal of V2 is used in the filter amplifier illustrated in diagrammatical form in Figure 5. In Figure 5 the valve V2 of the arrangement shown in Figure 1 is replaced by the electron multiplier valve including a dynode D which is connected to the output transmission line. The anode of the electron multiplier valve is de-coupled to ground by means of the capacitor C2 and also connected to the positive high tension source via the resistor R5. Thus a positive going pulse appearing at the input electrode of V2 causes a positive going pulse to appear at the dynode D. Referring to Figure 6, this figure illustrates one example of a push-pull filter amplifier according to the present invention. The amplifier comprises two sets of valves beginning with V1, V2 and V3, and V1′, V2′ and V3′. These valves have associated input lines including the inductances L1, L2 and L1′ and L2′ and the output lines include the inductances L3, L4 and L3′ and L4′. A number of shunt capacitors are shown between successive sections of the two input lines and ground in a similar way to those in Figure 2. In the arrangement of Figure 6 phase reversal can be achieved by crossing the anodes of a particular pair of valves and in this amplifier the anodes of V2 and V2′ are crossed so that the anode of V2′ is connected to the junction of L3 and L4 and the anode of V2 is connected to the junction of L3' and L4'. It will be understood that the values of the components making up the pairs of input and output transmission lines for the two halves of the filter amplifier shown in Figure 6 are chosen to cause one of the conditions, $t1=T1$, $t2=T2$ or $t1+t2=T1+T2$ to be satisfied as in the arrangement of Figure 1.

It is possible in accordance with the invention to obtain any reasonable pattern of partial pulses at the output while maintaining the grids and anodes in the same order as for a distributed amplifier. However it is easily seen that to do so will, in many cases, lead to delay lines of unnecessary length.

This difficulty may be reduced in a further from of amplifier according to the present invention in which at least two pulses are superimposed and in which the order of the anodes along the anode line is different from the order of the corresponding grids along the grid line.

Figure 7:
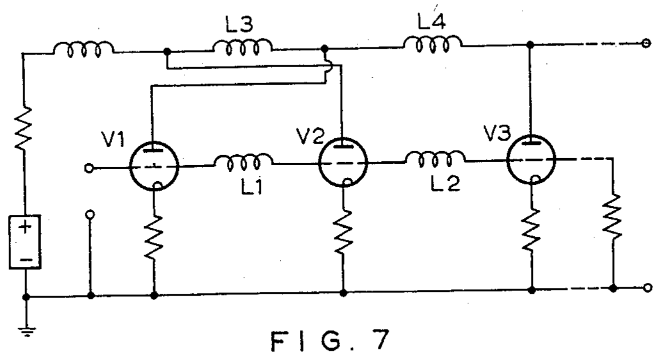

Figure 7 illustrates an example of an amplifier stage in which the order of the anodes along the output line is different from that of the order of the input electrodes along the input line and the grids of valves V1, V2, V3 are connected successively by inductors L1 and L2 as in Figure 1. However, the partial pulse outputs of V1 and V2 pass through inductors L4, and L3 and L4 respectively, which is opposite to the case of Figure 1.

In all the amplifier stages illustrated in the drawings, many circuit components which are conventional, such as decoupling components, have been omitted for simplicity. Moreover, phase reversal may occur in the case of more than one partial output pulse, and the valve, or valves, producing the phase reversal may be of any suitable valve or valves, in the amplifier stages. Moreover in determining the relative delays of the partial output signals at the output terminals of the amplifier, the duration of the input pulse must be taken into account. It will be understood furthermore that although the valves used for the purposes illustrated the various embodiments of the present invention are predominantly triodes, any other suitable form of valve may be used, thus in Figure 1 for example V1, V2 and V3 may be screen grid valves. In the amplifiers described herein and illustrated in the drawings it is arranged in all cases that the time delays from the input terminals to the output terminals via at least two of the partial amplifiers are substantially equal and the number of phase inversions in said partial amplifiers are predetermined to cause superpositioned with like polarity of the partial output signals produced at said output terminals in response to an input signal of predetermined duration applied to said input terminals, and the time delay from the input terminals to the output terminals via at least another partial amplifier is different from that via said two partial amplifiers to cause the respective partial output signal to be substantially dispersed relative to the partial output signals superimposed via said two partial amplifiers.

What I claim is:

1. A filter amplifier comprising an input transmission line, an output transmission line, at least three partial amplifiers, each partial amplifier comprising an input electrode connected to a point on said input line and an output electrode connected to a point on said output line, input terminals for applying signals to be amplified to one end of said input line, means terminating the other end of said input line, output terminals for deriving amplified signals from one end of said output line, means terminating the other end of said output line, the time delays from the input terminals to the output terminals via at least two of said partial amplifiers being substantially equal and the number of phase inversions in said two partial amplifiers being predetermined to cause superposition with like polarity of the partial output signals produced said output terminals in response to an input signal of predetermined duration at said two amplifiers, and the time delay from the input terminals to the output terminals via at least another partial amplifier being different from that via said two partial amplifiers to cause the respective partial output signal to be substantially dispersed relative to the partial output signals superimposed via said two partial amplifiers.

2. A filter amplifier according to claim 1 comprising means for varying the gain of said partial amplifier which contributes a dispersed partial output signal with respect to the gain of the partial amplifiers which contribute superimposed partial output signals.

3. A filter amplifier according to claim 1 comprising means for reversing the sign of said dispersed partial output signal relative to superimposed partial output signals.

4. A filter amplifier according to claim 3, said means for reversing the sign of said dispersed partial output signal comprising a pair of input lines connected for push-pull operation, the input electrodes of said partial amplifiers being selectively connected to said input lines according to the required phase relationship of their respective partial output signals.

5. A filter amplifier according to claim 3, said means for reversing the sign of said dispersed partial output signal comprising a phase reversing valve connected between the output electrode of a partial amplifier and the output transmission line.

6. A filter amplifier valve according to claim 3 one of said partial amplifiers comprising an electron multiplier valve, the dynode of which being connected as respective output electrode to the output line to cause reversal of the sign of a dispersed partial output signal relative to the superimposed partial output signals.

7. A filter amplifier according to claim 3 arranged for push-pull operation, the connections of the output electrodes of a pair of push-pull valves to the output transmission lines being reversed relative to those of another pair of push-pull valves to cause relative phase reversal of the partial output signal thereat.

8. A filter amplifier according to claim 4, the output electrodes of two of said partial amplifiers being connected to said output transmission line in different order to that in which the input electrodes are connected to said input transmission line.

9. A filter circuit comprising an input transmission line, an output transmission line, at least three transfer paths, each transfer path connecting a point on said input line to a point on said output line, input terminals for applying a signal to one end of said input line, means terminating the other end of said input line, output terminals for deriving an output signal from one end of said output line, means terminating the other end of said output line, the time delays from the input terminals to the output terminals via at least two of said transfer paths being subsantially equal and the number of phase inversions in said two transfer paths being predetermined to cause superposition with like polarity of the partial output signal produced at said output terminals in response to an input signal of predetermined duration at said input terminals, and the time delay from the input terminals to the output terminals via at least another transfer path being different from that via said two transfer paths to cause the respective partial output signal to be substantially dispersed relative to the partial output signals superimposed via said two transfer paths.

References Cited in the file of this patent

UNITED STATES PATENTS

| | | |
|---|---|---|
| 2,263,376 | Blumlein et al. | Nov. 18, 1941 |
| 2,790,956 | Ketchledge | Apr. 30, 1957 |

FOREIGN PATENTS

| | | |
|---|---|---|
| 112,749 | Australia | Apr. 3, 1941 |

OTHER REFERENCES

Pub. I.: "Distributed Translator For Ultrasonic Power," Electronics, July 1954, pp. 160–162.